Oct. 27, 1953    J. L. SMALLWOOD    2,656,572
ROCK CATCHER
Filed Aug. 28, 1950    2 Sheets-Sheet 1

INVENTOR:
JOHN LEE SMALLWOOD
BY Kingsland,
Rogers & Ezell
ATTORNEYS

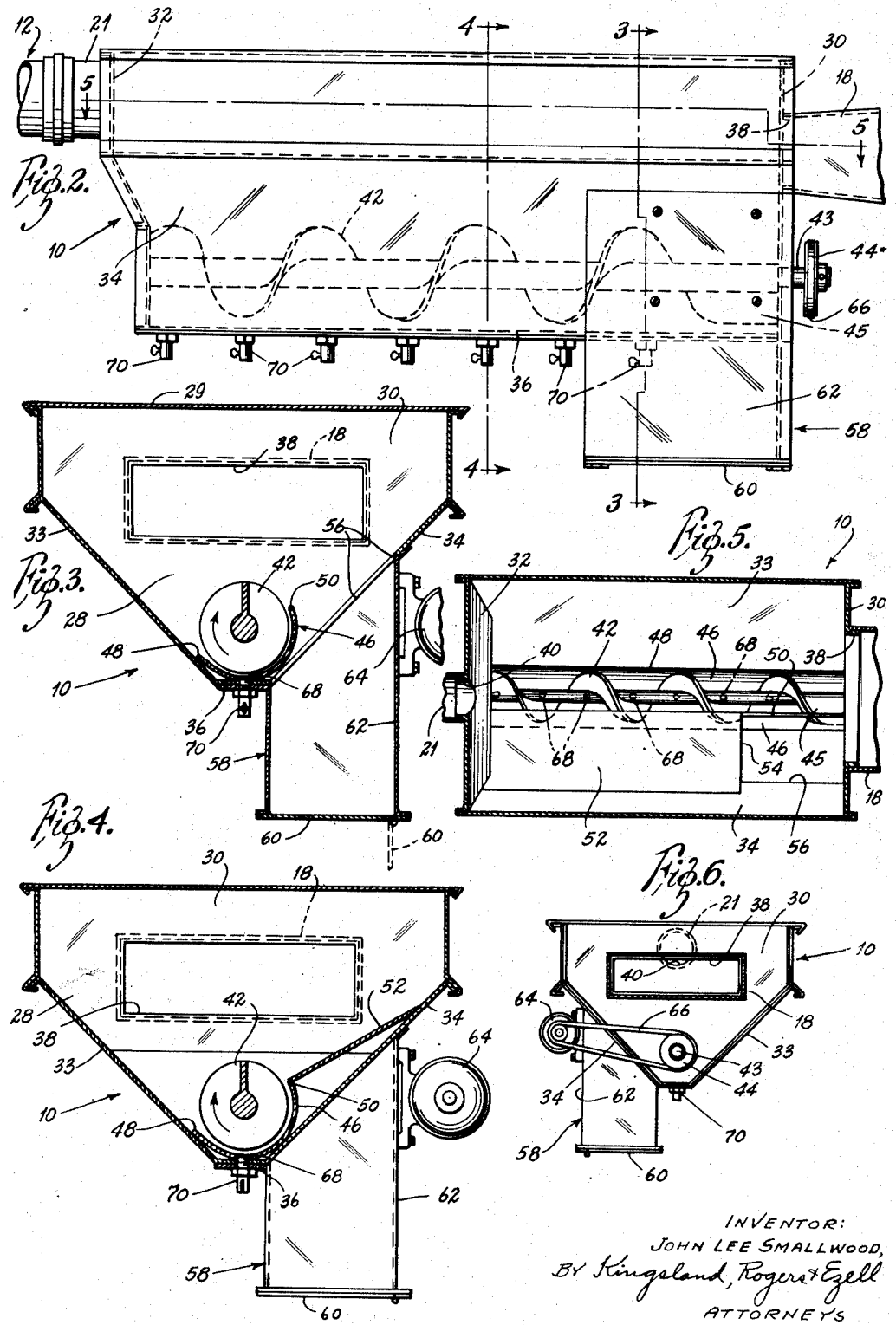

Patented Oct. 27, 1953

2,656,572

UNITED STATES PATENT OFFICE 2,656,572

ROCK CATCHER

John Lee Smallwood, Levelland, Tex.

Application August 28, 1950, Serial No. 181,740

5 Claims. (Cl. 19—76)

The present invention relates generally to the raw cotton processing art, and more particularly to a novel rock catcher for separating rocks and similar relatively heavy foreign material from the picked cotton before it enters the ginning machinery.

In one form, the device includes a housing having opposed end walls, a bottom wall and inwardly extending side walls. An inlet is provided in one end wall, and an opposed outlet is contained in the other wall, both the inlet and outlet being adjacent the upper end of the housing. Means are provided to cause a stream of air to flow through the housing from the inlet to the outlet and to suck the picked cotton and the foreign material intermingled therewith into the housing, whereby the cotton is carried out of the outlet to the ginning machinery, and the relatively heavy foreign material and some of the partially opened cotton bolls fall to the bottom of the housing. A conveyor is provided in the bottom of the housing for moving the foreign material toward the inlet end and out a discharge opening. Openings in communication with the atmosphere are provided in the bottom of the housing through which columns of air are drawn by the partial vacuum created within the housing so as to cause the partially opened cotton bolls and some of the lighter foreign material to be hurled upwardly into the air stream passing through the housing.

As is well known to those familiar with the art, a large amount of hard, relatively heavy, foreign material, such as rocks, roots, wire, etc., is picked up by mechanical type cotton pickers and is sucked up with the cotton at the gin plant. If it is not separated from the cotton, this foreign material gets into the ginning machinery and causes a great deal of damage to the saw teeth on the extracting cylinders, the bristles on the reclaimer brushes, etc. A few devices for separating this foreign material from the cotton have been devised and used, but with very little success because they tended to choke up and also to remove the partially opened cotton bolls along with the heavier foreign material.

It is an object of the present invention, therefore, to provide a novel rock catcher for separating relatively heavy, foreign material from the picked cotton without also removing the partially opened cotton bolls. More particularly, it is an object to provide a rock catcher for removing only the relatively heavy, foreign material from the picked cotton by carrying it through an air duct and into an expansion chamber wherein the relatively heavy material drops out and the lighter cotton continues through the outlet and to the ginning machinery.

Another object is to provide a rock catcher for separating the relatively heavy, foreign material from picked cotton, accumulating it, and discharging it from the rock catcher into a receptacle provided for that purpose. More particularly, it is an object to provide a rock catcher which includes a conveyor in the bottom thereof for conveying the precipitated foreign material to one end of the separator and into a discharge chute.

Another object is to provide a rock catcher for precipitating the relatively heavy, foreign material from an air stream passing therethrough, and which includes means for repeatedly returning the partially opened cotton bolls and the lighter foreign material to the air stream passing through the catcher at predetermined points in the catcher chamber. More particularly, it is an object to provide means for causing upwardly directed columns of air to pass through the precipitated material at predetermined intervals as it is conveyed along the bottom of the rock catcher to the discharge opening, so as to force some of the material upwardly and back into the air stream passing through the device.

Further objects and advantages of the present invention will be apparent from the following description, reference being had to the accompanying drawings wherein a preferred embodiment of the present invention is shown, in which:

Fig. 2 is an enlarged elevational view of the rock catcher alone with the motor for driving the conveyor omitted to better illustrate the internal construction of the device;

Figure 1:
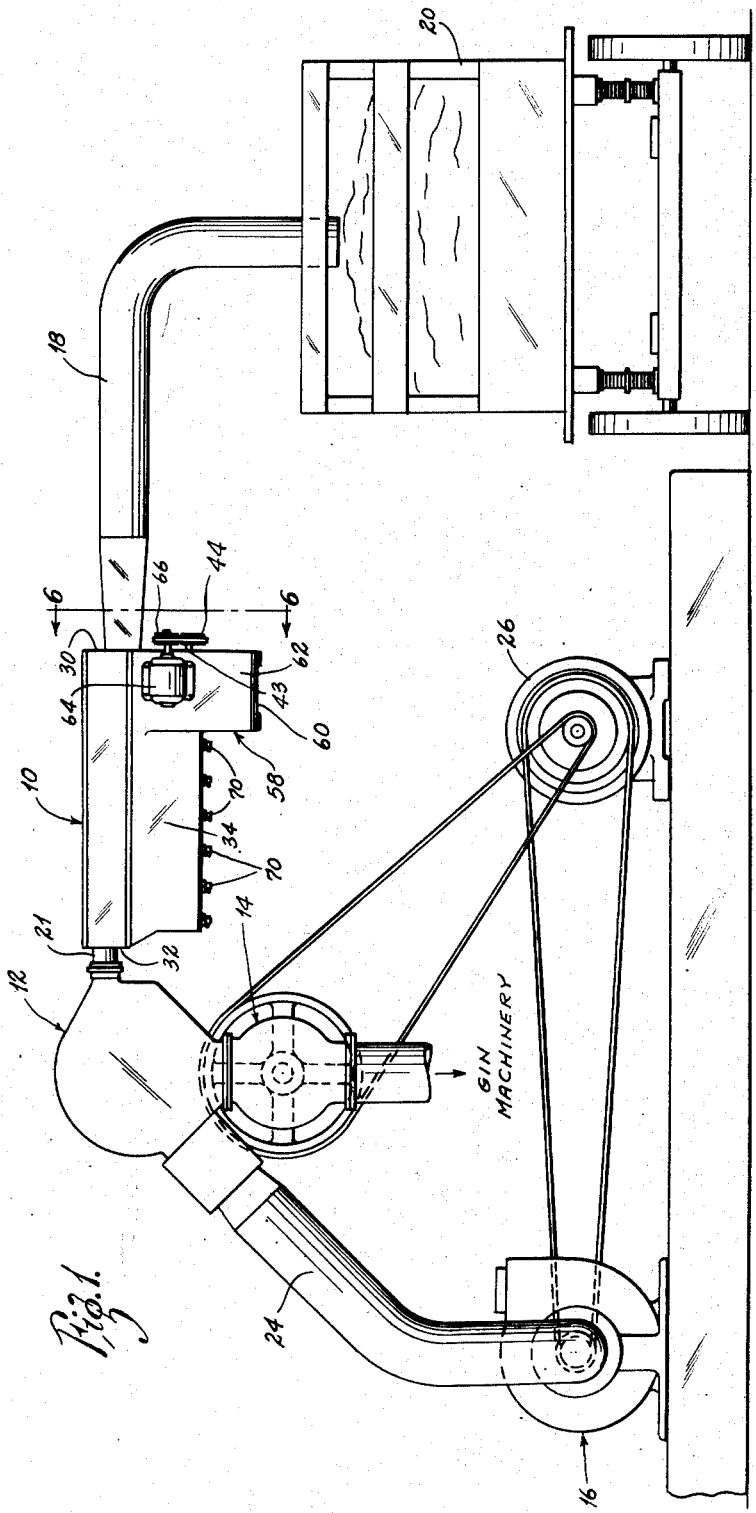
Fig. 1 is an elevational view of a rock catcher embodying the teachings of the present invention, shown in combination with a conventional separator for removing the cotton from the air stream, together with its associated equipment.

Figs. 3 and 4 are transverse sectional views taken on the lines 3—3 and 4—4, respectively, in Fig. 2;

Fig. 5 is a horizontal sectional view on a reduced scale, taken on the line 5—5 in Fig. 2; and Fig. 6 is an end view of the rock catcher on a reduced scale, as viewed from the right of Fig. 2.

Referring to the drawings more particularly by reference numerals, specifically Fig. 1, 10 indicates generally a rock catcher constructed in accordance with the teachings of the present invention, operatively connected with a conventional type separator 12 for removing the cotton from the air stream, a pneumatic dropper 14, and an exhaust fan 16 for creating a partial vacuum to cause a stream of air to pass through the rock catcher 10 and the separator 12.

A suction pipe 18, which is of rectangular cross section at one end, is connected to the inlet side of the rock catcher 10, and the other end of the pipe 18, which is of circular cross section, is disposed above a wagon or truck 20 containing the cotton which has been picked mechanically, and which also includes various types of relatively heavy, foreign material such as roots, rocks, wire, etc.

The outlet side of the rock catcher 10 is connected to the inlet side of the separator 12 by means of a conduit 21.

Disposed immediately below the separator 12 and connected thereto is the pneumatic dropper 14, into which the cotton passes after it has been removed from the air stream by means of the separator 12. From the dropper 14, the cotton passes to the ginning machinery (not shown).

Connected to the other side of the separator 12 is one end of an outlet air duct 24 which has its other end connected to the inlet side of the exhaust fan 16.

An electrical motor 26 drives both the pneumatic dropper 14 and the exhaust fan 16 by means of continuous belts.

As shown more particularly in Figs. 2 to 6, the rock separator 10 includes a housing which forms a chamber 28. The housing is preferably made of sheet metal and includes a top wall 29, an inlet end wall 30, an outlet end wall 32, inwardly sloping side walls 33 and 34, and a flat, relatively narrow bottom wall 36.

A rectangular shaped opening 38 is contained in the inlet end wall 30 adjacent the upper end thereof, and is of a size to receive the rectangular shaped end of the suction pipe 18.

Formed in the outlet wall 32 slightly above an imaginary horizontal line passing through the inlet opening 38 is a circular opening 40 (Fig. 5), which receives one end of the conduit 21. The other end of the conduit 21 is connected to the separator 12, as previously mentioned.

Rotatably supported within the chamber 28 between the end walls 30 and 32 and adjacent the bottom wall 36 is a horizontally disposed conveyor screw 42. One end of the conveyor screw contains a shaft 43 which extends through the inlet end wall 30 (Fig. 2), and which contains a pulley wheel 44 fastened adjacent its free end.

The end of the flange part of the conveyor screw 42, which is adjacent the inlet wall 30, extends substantially parallel with the axis of the screw so as to provide a kicker plate 45 (Figs. 2 and 5), for a purpose to appear.

Disposed under the conveyor screw 42 in cooperation therewith is a conveyor trough 46 of semi-circular cross section which extends the entire length of the housing (Fig. 5).

The pulley wheel 44 and the conveyor screw 42 are driven in the direction indicated in Figs. 3 and 4 whereby the screw 42, in cooperation with the trough 46, conveys any material which falls into the trough 46, toward the inlet end of the housing.

One edge 48 of the conveyor trough 46 terminates below the center of the conveyor screw 42 and is disposed against the downwardly sloping side wall 33 so that cotton or any foreign material, which might slide or roll down the side wall 33, will find its way into the conveyor trough 46 (Figs. 3 and 4).

The other edge 50 of the conveyor trough 46 extends upwardly about the conveyor screw 42 to a point above its center, and formed integral with the edge 50 and extending outwardly and upwardly from it to a line well up on the other side wall 34 is an apron-like member 52. Thus, any cotton or foreign material which rolls or slides down the side wall 34 and the apron-like member 52 will also find its way into the conveyor trough 46 so as to be carried along by the conveyor screw 42. As shown in Fig. 5, the apron-like member 52 does not extend the full length of the housing. It extends from the outlet wall 32 about three-fourths of the length of the housing and terminates in an edge 54 spaced from the inlet wall 30.

The side wall 34 contains an opening 56 which is adjacent the inlet end wall 30 and directly below and in alignment with the opening formed by the edge 54 of the apron-like member and the inlet end wall 30.

Fastened to the outside of the side wall 34 about the opening 56 so as to extend downwardly therefrom, is a chute 58 of rectangular cross section. A door 60 is hinged to a bottom edge of the chute 58 and is normally held in a closed position by a partial vacuum created within the rock catcher housing by the exhaust fan 16.

The chute 58 includes an outer vertical wall 62 on which is mounted an electric motor 64 for driving the pulley wheel 44 (and conveyor screw 42) by means of a continuous belt 66.

A series of spaced openings 68 are formed in the bottom of the rock catcher housing and extend through the bottom wall 36 and the conveyor trough 46 so as to form a passageway between the bottom of the conveyor trough 46 and the atmosphere outside the housing. These openings 68 are contained in all parts of the housing bottom except that portion adjacent the opening 56.

Disposed in the openings 68 are adjustable valves 70 for varying the amount of air passing into the chamber 28 due to the partial vacuum maintained therein. The valves 70 are preferably adjusted so that the amount of air passing through the openings 68 increases with increase in distance from the outlet end wall 32.

*Operation*

The electric motor 26 drives the pneumatic dropper 14 and exhaust fan 16 so that the latter creates a partial vacuum in the separator 12 and the rock catcher 10. This causes air to be sucked into the free end of the suction pipe 18 and to pass through the pipe 18, the rock catcher 10, the conduit 21, the separator 12, the outlet duct 24 and the exhaust fan 16.

Thus, when a truck or wagon 12 containing cotton which has been mechanically harvested and which contains relatively heavy, foreign material such as rocks, roots, wire, etc., intermingled therewith, is placed adjacent the free end of the suction pipe 18, the cotton and foreign material are drawn into the pipe 18.

From the suction pipe 18 the cotton and foreign material pass through the inlet opening 30 into the rock catcher chamber 28. The cotton and light weight foreign material, such as leaves and trash, pass out through the outlet opening 40, through the conduit 21 and into the separator 12. From the separator 12, the cotton and light weight foreign material pass into the pneumatic dropper 14 and thence to the ginning machinery (not shown).

The relatively heavy, foreign material and some of the cotton bolls which are only partially opened, however, do not pass through the rock catcher 10, but, instead, fall onto the side wall 33 or the apron-like member 52, and into the conveyor trough 46, and are moved along the trough toward the inlet end of the rock catcher by the conveyor screw 42 acting in cooperation with the trough 46. As the partially opened cotton bolls and foreign material pass over the openings 68, the inrushing columns of air, caused by the partial vacuum within the chamber 28, causes the cotton bolls and some of the lighter weight foreign material to be hurled upwardly into the air stream passing through the chamber 28. The valves 70 are adjusted so that only the partially opened cotton bolls and some of the lighter weight foreign material are hurled upwardly and so that the heavier foreign material remains in the conveyor trough 46. Some of the partially opened cotton bolls and the lighter foreign material which enter the air stream pass out through the outlet opening 40, but some fall back into the conveyor trough 46 and are hurled upwardly again and again as they approach the inlet end of the chamber and the chute 58 until, eventually, substantially all of the partially opened bolls have been removed.

The heavier foreign material and the small amount of partially opened cotton bolls which reach the end of the conveyor adjacent the inlet end wall 30 are struck by the kicker plate 45 on the conveyor screw, and are repeatedly hurled upwardly against the side and top walls of the housing until the partially opened bolls are caught up in the air stream and carried out through the outlet 40, or, until they fall through the opening 56 and into the chute 58 with the rocks and other relatively heavy, foreign material.

When the exhaust fan 16 is stopped, the partial vacuum within the chamber 28 and the chute 58 is destroyed whereby the door 60 is opened by gravity so as to cause the rocks, roots, wire, etc., to fall into a container (not shown) positioned under the chute to receive them.

Thus, it is apparent that there has been provided a novel rock catcher which fulfills all of the objects and advantages sought therefor. The relatively heavy foreign material, such as rocks, wire, roots, etc., which would normally damage the ginning machinery, is automatically and continuously removed from amongst the cotton and the latter allowed to pass to the ginning machinery. Also, the valves 70 can be adjusted so that the air entering through the openings 68 will repeatedly hurl the partially opened cotton bolls into the air stream until substantially all are carried from the chamber 28 by the air stream, and only the heavier, foreign material and very few, if any, partially opened bolls enter the chute 58 and are discarded. The kicker plate 45 also hurls the material upwardly into the air stream adjacent the inlet to further assure that almost all of the partially opened cotton bolls will leave the chamber via the outlet opening 40.

It is to be understood that the foregoing description and the accompanying drawings have been given only by way of illustration and example, and that changes and alterations in the present disclosure, which will be readily apparent to one skilled in the art, are contemplated as within the scope of the present invention, which is limited only by the claims which follow.

What is claimed is:

1. A device of the type described, comprising a housing having opposed end walls, a bottom wall, and inwardly sloping side walls; an inlet in one end wall and an outlet in the other end wall; a screw-like conveyor member rotatably mounted within the housing adjacent the bottom wall, the flange portion of the screw-like member adjacent one end thereof being substantially parallel with the axis of rotation so as to provide a kicker plate; an opening in one of the side walls adjacent the kicker plate; and chute-like means extending from the housing about said opening.

2. A device of the type described, comprising a housing having opposed end walls, a bottom wall, and inwardly sloping side walls; an inlet in one end wall and an outlet in the other end wall; a screw-like conveyor member rotatably mounted within the housing adjacent the bottom wall, the flange portion of the screw-like member adjacent one end thereof being substantially parallel with the axis of rotation so as to provide a kicker plate; an opening in one of the side walls adjacent the kicker plate; and means for rotating the screw-like conveyor member so that the kicker plate rotates in the direction to hurl material from adjacent the bottom wall toward the other wall which does not contain the opening.

3. A device of the type described, comprising a housing having opposed end walls, a bottom wall, and inwardly sloping side walls; an inlet in one end wall and an outlet in the other end wall; a screw-like member rotatably mounted in the housing adjacent the bottom wall; a trough-like member of semi-circular cross section disposed about the underside of the screw-like member so as to cooperate therewith to provide a conveyor, one of the edges of the trough-like member being disposed against one side wall and the other edge extending upwardly away from the other side wall; and a flat apron-like member extending from said other edge upwardly and outwardly to said other side wall adjacent the upper end thereof.

4. A device of the type described, comprising a housing having opposed end walls, a bottom wall, and inwardly sloping side walls; an inlet in one end wall and an outlet in the other end wall; a screw-like member rotatably mounted in the housing adjacent the bottom wall; a trough-like member of semi-circular cross section disposed about the underside of the screw-like member so as to cooperate therewith to provide a conveyor, one of the edges of the trough-like member being disposed against one side wall and the other edge extending upwardly away from the other side wall; a flat apron-like member extending from said other edge upwardly and outwardly to said other side wall adjacent the upper end thereof; aligned openings in the apron-like member and said other side wall adjacent the inlet end of the housing; the flange portion of the screw-like member adjacent said openings being substantially parallel with the axis of rotation so as to provide a kicker plate; and means for rotating the screw-like member so that material in the conveyor is moved toward the inlet end of the housing and the kicker plate rotates in the direction to hurl material from the conveyor toward the said one side wall which does not contain the opening.

5. A device of the type described, comprising a housing having opposed end walls, a bottom wall, and inwardly sloping side walls; an inlet in one end wall and an outlet in the other end wall; a screw-like member rotatably mounted in the housing adjacent the bottom wall; a trough-like member of semi-circular cross section disposed about the underside of the screw-like member so as to cooperate therewith to provide a conveyor, one of the edges of the trough-like member being disposed against one side wall and the other edge extending upwardly away from the other side wall; a flat apron-like member extending from said other edge upwardly and outwardly to said other side wall adjacent the upper end thereof; aligned openings in the apron-like member and said other side wall adjacent the inlet end of the housing; the flange portion of the screw-like member adjacent said openings being substantially parallel with the axis of rotation so as to provide a kicker plate; means for rotating the screw-like member so that material in the conveyor is moved toward the inlet end of the housing and the kicker plate rotates in the direction to hurl material from the conveyor toward the said one side wall which does not contain the opening; and spaced openings in the bottom of the housing extending through the bottom wall and the trough-like member, said openings being in communication with the atmosphere outside the housing.

JOHN LEE SMALLWOOD.

References Cited in the file of this patent

UNITED STATES PATENTS

| Number | Name | Date |
|---|---|---|
| 526,326 | Potter | Sept. 18, 1894 |
| 690,652 | James | Jan. 7, 1902 |
| 1,059,270 | Brown | Apr. 15, 1913 |
| 1,159,168 | Broome | Nov. 2, 1915 |
| 1,574,384 | Garner | Feb. 23, 1926 |
| 2,262,326 | Lawrence | Nov. 11, 1941 |

FOREIGN PATENTS

| Number | Country | Date |
|---|---|---|
| 480,934 | Germany | Mar. 21, 1930 |